April 24, 1934. R. W. SNYDER 1,956,050
MANUFACTURE OF RUBBER TUBES
Filed April 2, 1931
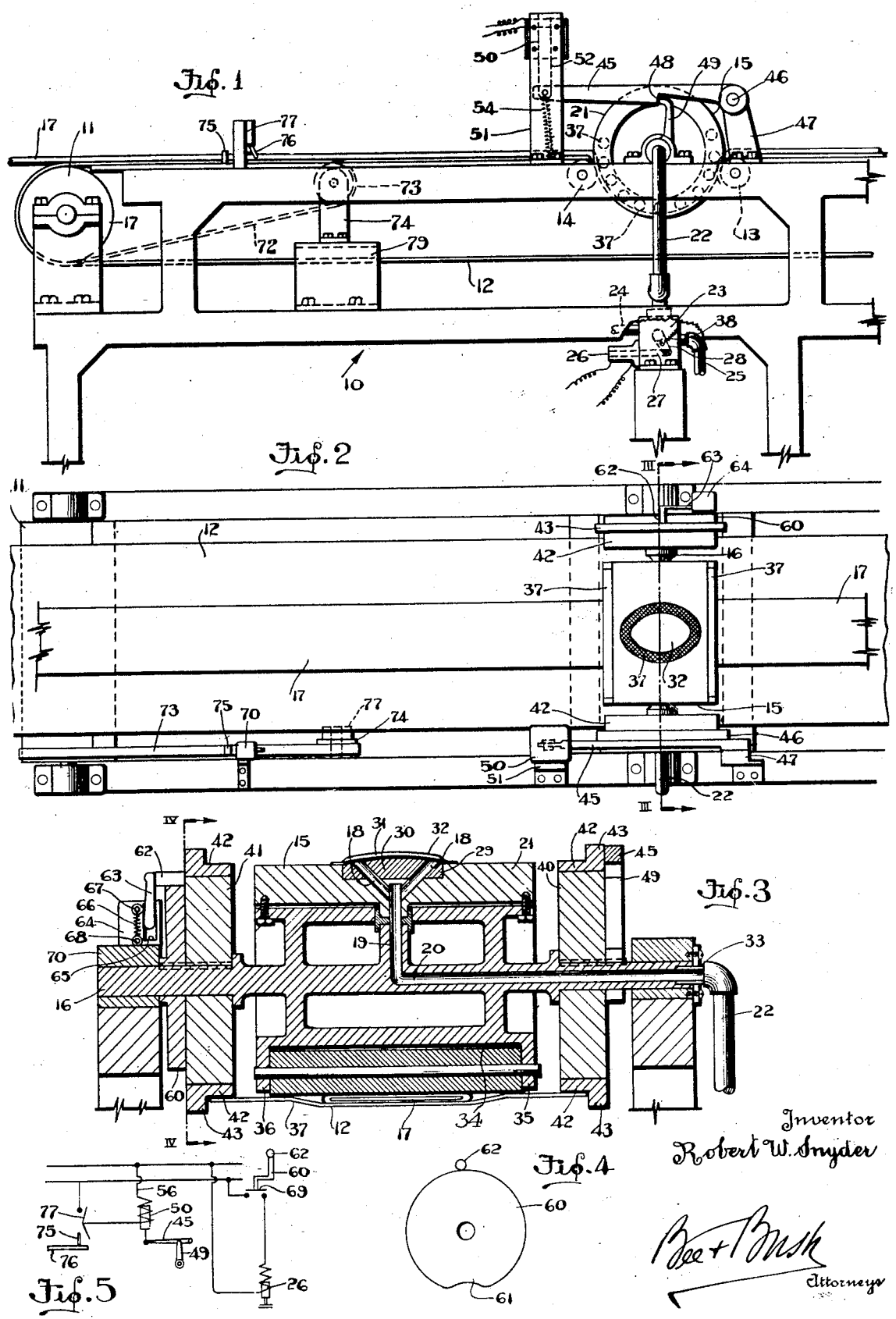

Patented Apr. 24, 1934

1,956,050

UNITED STATES PATENT OFFICE 1,956,050

MANUFACTURE OF RUBBER TUBES

Robert W. Snyder, Akron, Ohio, assignor to Wingfoot Corporation, Wilmington, Del., a corporation of Delaware Application April 2, 1931, Serial No. 527,176

17 Claims. (Cl. 154—14)

The invention relates to an apparatus for manufacturing inner tubes for pneumatic tires, and it has particular relation to a device for applying valve patches to the tube at a point where the valve stem is located.

One object of the invention is to provide in an apparatus for manufacturing inner tubes, means for automatically applying a valve patch to each tube.

Another object of the invention is to provide an apparatus for automatically applying valve patches or the like to a band of continuous rubber material during the latter's course of movement in the process of manufacturing inner tubes.

One method of manufacturing rubber inner tubes for pneumatic tires comprises extruding a tubular strip of rubber by means of an extruding machine constructed for this purpose, and transporting the strip continuously upon a moving conveyor. As the strip is moved along by the conveyor, it is severed into individual tubes. Workmen manually apply an oblong patch constructed of fabric to each individual tube. Then an opening was punched or cut through the patch and one wall of the tube and a valve stem was disposed in the opening and firmly secured to the tube. Then the ends of the tube were spliced and cemented together and the tube vulcanized.

This invention is concerned with automatic means for applying valve patches to the inner tube stock prior to severance thereof into individual tubes. Particularly, the invention comprises an endless belt driven in synchronism with the conveyor, which has electric circuit controlling means operated at one instant during each revolution of the belt. When the circuit is closed, a solenoid in the circuit is energized, which in turn releases a latching mechanism normally preventing rotation of a drum. The drum contacts with the continuous band of inner tube stock disposed on the conveyor, and when released by operation of the solenoid and latching mechanism, it is rotated by the conveyor belt. At one point in its periphery normally out of contact with the inner tube stock, the drum is provided with one or more openings which communicate internally of the drum, with a suitable air pump adapted to evacuate the air in such openings. Hence, when a valve patch, composed preferably of rubberized fabric, is disposed over the openings, it is retained against the outer periphery of the drum by means of the atmospheric pressure. When the drum is rotated, after releasing the latching mechanism, the valve patch is retained in contact with the periphery of the drum until it is disposed between the inner tube stock and the drum, and then a cam mechanism operated by rotation of the drum allows air to flow into the openings in the drum which formerly were substantially evacuated of air, thereby neutralizing the atmospheric pressure against the outer side of the patch. It follows that the patch is released from the drum and stitched thereby to the inner tube stock. When the drum has completed one revolution it is prevented from further rotation by the latching mechanism until the endless belt again has completed one revolution. While the drum is stationary a workman disposes a patch over the openings in the drum which at that time are in communication with the air evacuating pump. It is evident that valve patches can be applied at equal intervals to a continuously moving band of inner tube stock, thereby increasing the efficiency of manufacturing inner tubes and also enabling production of a uniform product.

If the patch is so constructed that some air can be drawn through it during the time it is being applied to the tube stock, the air in the tube will force the upper wall of the latter against the patch and drum, thereby stitching the patch to the tube wall. This operation avoids stitching the patch to the tube by means of pressing both walls of the tube together. Hence, the adjacent inner surfaces of the tube will not be pressed together and less lubricant, such as soapstone, will be necessary to prevent the walls from adhering to each other.

For a better understanding of the invention, reference may now be had to the accompanying drawing, forming a part of this specification, in which Fig. 1 is a fragmentary side elevational view of an inner tube manufacturing apparatus constructed according to one form of the invention;

Fig. 2 is a plan view of the construction shown by Fig. 1;

Fig. 3 is a cross-sectional view on a larger scale taken substantially along the line III—III of Fig. 2;

Fig. 4 is a cross-sectional view taken along the line IV—IV of Fig. 3; and

Fig. 5 is a diagrammatical view of an electrical circuit designed for operating certain parts of the machine.

Referring to Fig. 1, a structural framework 10 is provided having a roller 11 journalled in one end thereof, and other rollers (not shown) which support an endless conveyor belt 12. One or more of the rollers may be driven by any suitable power-operated device in order to drive the conveyor belt. Also, the belt is trained over a pair of rollers 13 and 14 in the upper part of the framework and then under a drum 15 rigidly secured to a shaft 16 rotatably supported by the framework between these rollers. A continuous band of inner tube stock 17 which is extruded from an extruding machine (not shown) is supported by the conveyor belt 12 and is conducted between the drum 15 and the belt.

As best shown by Fig. 3, the drum 15, at one point in its periphery, is provided with removable segment 21 having a plurality of openings 18 which communicate with an opening 19 directed radially toward the axis of the drum. The opening 19 in turn communicates with an opening 20 extending longitudinally and centrally of the shaft 16 and to one of its outer ends. This end of the shaft is connected to a conduit 22 which, as best shown by Fig. 1, communicates with a valve 23 of such construction that either of a pair of conduits 24 and 25 may be operatively connected to the conduit 22. The conduit 24 communicates with the atmosphere while the conduit 25 is connected to a suitable air-evacuating pump adapted to evacuate air from the openings 18, 19 and 20, and from the conduits 22 and 25. When the conduit 25 is disconnected from the conduit 22, and the conduit 24 operatively connected to the conduit 22 by means of the valve 23, the substantial vacuum created in the openings 19 and 20 and the conduit 22 is quickly released by reason of the flow of air from the atmosphere through the conduit 24 and into such evacuated spaces. Any suitable connection 33 between the end of the shaft 16 and the conduit 22 may be provided which will permit rotation of the shaft 16 with respect to the conduit, although maintaining an air-tight connection between such parts. Such connections are not new, and it does not seem necessary that one should be shown or described in detail. In order to operate the valve 23, a solenoid 26 is provided, which has a core 27 connected to a valve operating arm 28. A spring 38 connected to the arm 28 and a stationary part of the valve 23, normally maintains the arm in such position that the conduit 25 communicates with the conduit 22.

At the outer ends of the openings 18, a recess 29 is provided in the segment 21, in which a cushioning element 30 is secured. The cushioning element may be composed of rubber, rubberized fabric or similar material. Outwardly of the cushioning element 30, a screen 31 is secured to the former, which prevents foreign substances from being forced through the openings 18 because of the atmospheric pressure on the outside of the drum. From the foregoing description it is evident that a valve patch 32 may be disposed on the cushioning element 30 and over the openings 18 and retained on the drum by reason of a substantial vacuum in the openings 18 and atmospheric pressure on the outer side of the patch.

Diametrically opposite the cushioning element 30, the drum is provided with a circumferentially extending recess 34 which is bordered at opposite edges of the drum by flanges 35 and 36. One or more rollers 37 may be journaled in the flanges 35 and 36 to provide, in effect, a rolling surface at the lower side of the drum when the latter is not rotated, and the inner tube stock is being conducted under the drum by the conveyor belt.

The shaft 16 at opposite ends of the drum 15 is provided with a pair of steel pulleys 40 and 41 rigidly secured thereto, each of which is encircled by a bronze band 42 substantially equal in diameter to that of the drum 15 for engaging the edge portions of the conveyor belt. Outwardly directed radial flanges 43 on the bands 42 maintain the conveyor belt in proper position by preventing undesirable sidewise movement thereof. The bands 42 snugly fit the outer peripheries of the pulleys 40 and 41, and will rotate them unless they are locked in position, in which event the bands will rotate about the pulleys.

While the conveyor belt 17 is moving beneath the drum 15, the latter is prevented from rotating by a latching member 45 (Fig. 1) pivoted, as indicated at 46, to a bracket 47 secured to the upper side of the framework 10. The latching member 45 is provided with a notch 48 in its lower edge which normally engages the upper end of an arm 49, which in turn is rigidly secured to the shaft 16. Hence, the latching member 45 normally prevents rotation of the drum. In order to release the latching member 45 from engagement with the arm 49, a solenoid 50 is provided which is mounted in the upper end of a standard 51 projecting upwardly from the framework 10. The solenoid 50 is operatively associated with a core 52 in turn pivotally connected to the free end of the latching arm 45. Normally, the arm 45 is maintained in its operative position by a spring 54 connecting the free end of the arm and the base of the standard 51.

The shaft 16 adjacent the pulley 41 also is provided with a cam 60 (Figs. 3 and 4) having a cam surface 61 in its outer periphery, which is of lesser radius than the remaining peripheral surface of the cam. When the drum is in its stationary position, the cam surface 61 is at the lower side of the cam 60, as best shown by Fig. 4. The outer peripheral surface of the cam 60 supports and engages a roller 62 journaled in the upper end of an electrical switch operating arm 63, which, at its lower end, projects into a switch box 64 and is connected to a switch 69 (Fig. 5). The arm 63 is movable in a vertically disposed slot 65 in the switch box 64 and is urged downwardly toward the lower end of the slot by means of a spring 66 connected to an eye 67 secured to the arm 63, and to an eye 68 on a bearing bracket 70 supporting one end of the shaft 16. It is apparent that when the shaft 16 and cam 60 are permitted to rotate, the roller 62 will move along the surface of the cam 60 and finally is moved downwardly on the surface 61 by means of the spring 64. This causes a vertical movement of the switch operating arm 63 and the closing of an electrical switch 69 in the switch box 64.

The roller 11 supporting the conveyor belt 12 also supports at one end a second belt 72 which also is trained about a roller 73 journaled in the upper end of a standard 74 secured to the framework 10. At one point on its outer periphery the belt 72 is provided with a lug 75 which is adapted to engage at intervals, once during each revolution of the belt, a switch operating arm 76 of a normally open electrical switch 77.

The operation of the mechanism described will be illustrated by referring particularly to the electrical circuit diagrammatically illustrated by Fig. 5. When the lug 75 on the belt 72 engages the switch arm 76, it closes an electrical circuit which includes the solenoid 50. Energization of the solenoid 50 causes an upward movement of the latching member 45, thereby releasing the shaft 16 and allowing it to be rotated by the pulleys 40 and 41, bands 42 and the conveyor belt 12. When the drum is rotated (with a valve patch 32 disposed over the openings 18) the patch is maintained in contact with the drum until the latter turns substantially through 180°, when the cam 60 has rotated sufficiently to permit the roller 62 to move downwardly upon the surface 61, thereby closing the electrical switch 69. This causes energization of the solenoid 26, which operates the valve 23. Operation of the valve 23 at this instant causes disconnection of the conduit 25 from the conduit 22 and connection of the conduit 24 to the conduit 22. This permits air under atmospheric pressure to enter the conduit 22, thereby releasing the patch 32 from the drum. Contact of the drum with the inner tube stock 22 causes the patch to be stitched to the inner tube stock and to be moved along therewith. The drum continues its rotary movement until it again reaches its original position when the arm 48 is again engaged by the latching member 46. Previous to the drum assuming its latter position, the switch 69 has been opened and the conduit 25 again connected with the conduit 22, thereby connecting an air-evacuating pump with the openings 18. An operator then disposes a second patch over the openings 18 which is retained thereon by atmospheric pressure. The patches are applied at regular intervals depending upon the length of the belt 72, or in other words, the time it requires for the lug 75 to complete a revolution about the pulleys 11 and 77. Manifestly, this time may be varied by varying the length of the belt. The patch 32 may be so constructed that some air can be forced through it. Then stitching of the patch to the upper wall of the inner tube stock 17 is effected in a modified manner. As the patch contacts with the tube, the air between the latter and the patch is quickly drawn through the patch and through the openings 18 in the drum. Consequently, air bubbles between the patch and tube may effectively be avoided. Also, removing the air between the tube and patch causes the air in the tube to force the upper wall of the latter against the patch, thereby stitching these parts together. This arrangement makes it unnecessary to have the belt 12 exert any pressure against the tube stock for stitching the patch to the tube, and as a result, the adjacent walls of the tube will adhere less readily and less lubricant, such as soapstone, is needed in the tube to prevent such adhesion.

It is evident that a machine provided according to this invention constitutes an efficient and automatic means for applying valve reinforcing patches to inner tues. Utilization of a machine of this character insures application of the valve patches at regular intervals and that the patches will be securely stitched to the inner tube stock. The only manual labor required in the operation of the machine is that necessary to place valve patches over the openings 18 of the drum.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. An apparatus for manufacturing inner tubes for pneumatic tires comprising means for conveying a strip of material, means for applying a reinforcing element to the strip, means normally locking the element applying means against movement, means for releasing the locking means and means for operating the element applying means at regular intervals.

2. An apparatus for applying reinforcing patches to an elongate strip of material which comprises means for moving said material, means for applying the patches to the material and means for periodically moving the patch applying means.

3. An apparatus for manufacturing inner tubes comprising means for moving a strip of material, a rotatable drum engaged by such means and adapted to be rotated thereby, means for normally preventing rotation of the drum, means for retaining a valve patch on the drum, means for permitting intermittent rotation of the drum, and means for releasing the valve patch during rotation of the drum when the patch engages the strip of material.

4. An apparatus for manufacturing inner tubes for pneumatic tires comprising means for conveying a continuous band of material, a rotatable drum engaged by the conveying means and adapted to be driven thereby, means for retaining a valve reinforcing patch on the drum, means normally preventing rotation of the drum, means for causing said last mentioned means to be inoperative at regular intervals, and means for releasing the patch from the drum when during its rotation the patch engages the material.

5. An apparatus for applying valve patches to inner tube stock moving along in a continuous strip on a conveyor, which comprises periodically movable means for applying the patches at regular intervals to the tube stock, said means including an endless member driven in synchronism with the movement of the stock and means on the endless member for controlling the operation of the first mentioned means.

6. An apparatus for applying reinforcing elements to elongate strips of material, which comprises means for continuously conveying the material, means for normally retaining one or more preformed patches above the continuously conveyed material, means for periodically moving the patch retaining means with respect to the material conveying means, and means for positively releasing the patches one by one at regular intervals and causing them to be disposed on the material.

7. An apparatus for applying reinforcing elements to elongate strips of material which comprises continuously moving conveying means for supporting the material, rotatable fluid actuated means for retaining a patch above the material, means for periodically rotating the patch retaining means relative to the material carried by the conveying means, and means operating in conjunction with the fluid operated means for positively releasing the valve patch at predetermined intervals.

8. An apparatus for applying reinforcing elements to an elongate strip of material comprising a drum, having openings located at one point in i's periphery, said openings normally being in communication with an air evacuating device whereby a reinforcing element disposed over the openings normally will be retained against the surface of the drum, means for moving the material relative to the drum and means operated at intervals for admitting air into the openings 18 thereby permitting the valve patch to be disposed on the material.

9. In an apparatus of the class described, a drum having at one point in its periphery a circumferentially extending recess, and a plurality of rotatable elements disposed in such recess.

10. In an apparatus of the class described, a drum having a circumferentially extending recess in its periphery, outwardly projecting flanges at the ends of the recess, and one or more rollers disposed in the recess and journaled in the flanges.

11. In a machine for applying reinforcing elements to elongate strips of material, a drum having one or more openings in its outer peripheral surface, an air-evacuating mechanism, and valve means connecting the drum openings normally with the air-evacuating mechanism and periodically with the atmosphere.

12. The method of applying elements to a strip of material, which comprises retaining the elements on a form above the material by means of negative air pressure, relatively moving the form with respect to the material, and at intervals positively releasing the elements by changing the air pressure from negative to positive.

13. The method of applying a permeable element to a tubular, flexible material, which comprises retaining the elements on a form by means of a substantial vacuum between the form and element, moving the form and material relatively until the element contacts with the material, and by means of the substantial vacuum between the form and element and the permeability of the element, drawing one wall of the material against the element, and then allowing air to flow between the form and element.

14. The method of applying patches or the like to a strip of rubber or similar material, which consists in creating a vacuum between the patch and strip, which causes the parts to be pressed together forcefully and avoids air pockets between them.

15. In apparatus for applying patches to a strip of material, a drum, means on the drum for releasably holding a patch thereon, and rotatable elements journaled on the drum, nonadjacent the patch holding means.

16. In combination, flexible conveyor means for supporting and moving a strip of material, a rotatable drum positioned in the path of the flexible conveyor means so that the flexible conveyor means will follow the contour of the drum through a portion of the circumferential surface thereof, means providing a rolling surface on the portion of the drum contacted by the flexible conveyor means, means positioned on the remaining drum surface for removably holding a patch and means for periodically turning the drum to apply a patch to the material carried by the conveyor means.

17. In a device of the character described a conveyor belt, a drum having contact throughout a portion of its circumference with the belt, rolling means on belt contacting portion of the drum and means on the remaining surface of the drum for releasably carrying a reinforcing element.

ROBERT W. SNYDER.